(12) United States Patent
Hiramitsu et al.

(10) Patent No.: US 10,150,384 B2
(45) Date of Patent: Dec. 11, 2018

(54) POWER CONTROL APPARATUS FOR FUEL CELL VEHICLE

(71) Applicant: MITSUBISHI JIDOSHA KOGYO KABUSHIKI KAISHA, Tokyo (JP)

(72) Inventors: Yusuke Hiramitsu, Tokyo (JP); Kazuyoshi Nakane, Tokyo (JP); Chikara Takei, Tokyo (JP); Keisuke Tashiro, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 78 days.

(21) Appl. No.: 15/469,897

(22) Filed: Mar. 27, 2017

(65) Prior Publication Data

US 2017/0361730 A1 Dec. 21, 2017

(30) Foreign Application Priority Data

Jun. 17, 2016 (JP) .................. 2016-121031

(51) Int. Cl.
*B60L 11/18* (2006.01)
*H01M 8/04* (2016.01)
*H01M 8/04828* (2016.01)
*H01M 8/1018* (2016.01)

(52) U.S. Cl.
CPC ....... *B60L 11/1887* (2013.01); *B60L 11/1803* (2013.01); *B60L 11/1805* (2013.01); *B60L 11/1807* (2013.01); *B60L 11/1809* (2013.01); *B60L 11/1898* (2013.01); *H01M 8/0494* (2013.01); *H01M 2008/1095* (2013.01); *H01M 2250/20* (2013.01); *Y02T 90/32* (2013.01)

(58) Field of Classification Search
CPC ............. B60L 11/1887; B60L 11/1898; B60L 11/1803; B60L 11/1805; B60L 11/1807; B60L 11/1809; H01M 8/0494; H01M 2008/1095; H01M 2250/20; Y02T 90/32
See application file for complete search history.

(56) References Cited

U.S. PATENT DOCUMENTS

| 2007/0199747 A1* | 8/2007 | Aoyagi ............... B60L 11/1861 180/65.31 |
| 2010/0168943 A1* | 7/2010 | Fukushiro ................ B60K 6/46 701/22 |
| 2017/0222238 A1* | 8/2017 | Kumada ........... H01M 8/04925 |

FOREIGN PATENT DOCUMENTS

JP 2014-143851 A 8/2014

\* cited by examiner

*Primary Examiner* — Renee Luebke
*Assistant Examiner* — Paul Baillargeon
(74) *Attorney, Agent, or Firm* — Birch, Stewart, Kolasch & Birch, LLP

(57) ABSTRACT

Provided is a power control apparatus for a fuel cell vehicle which includes a fuel cell and which is driven by an electric motor that is supplied with electric power from the fuel cell. The power control apparatus includes an accelerator sensor that detects an operation of an accelerator, and a control unit that controls the fuel cell to increase the output power of the fuel cell so as to correspond to an increase in a requested acceleration output based on the detected accelerator opening degree. When the accelerator opening degree is less than a first accelerator determination value that is set in advance, the control unit controls the fuel cell to suppress an increase in the output power thereof.

17 Claims, 5 Drawing Sheets

POWER CONTROL APPARATUS FOR FUEL CELL VEHICLE

BACKGROUND OF THE INVENTION

Field of the Invention

The present invention relates to a power control apparatus for a fuel cell vehicle which includes a fuel cell and which is driven by an electric motor that is supplied with electric power from the fuel cell.

Description of the Related Art

As awareness with respect to environmental issues in recent years increases, fuel cell systems are attracting attention as one kind of system for clean energy generation that does not rely on fossil fuels. For example, a polymer electrolyte fuel cell is used in a fuel cell system that is mounted in a vehicle. The polymer electrolyte fuel cell is built by forming an MEA by bonding a fuel electrode and an air electrode that carry platinum (Pt) as a catalyst on either side of a polymer electrolyte membrane, and stacking a large number of single cells in each of which the MEA is sandwiched by gas diffusion layers and separators. Humidity-regulated fuel gas is supplied to the fuel electrode and humidity-regulated air is supplied to the air electrode, and by this means a power generation reaction proceeds in the catalyst layers of the fuel electrode and the air electrode to thereby start power generation of the fuel cell.

In a fuel cell vehicle in which the aforementioned kind of fuel cell is mounted, for example, as in technology disclosed in Patent Literature (Japanese Patent Laid-Open No. 2014-143851), the output power of a fuel cell is controlled based on an accelerator opening degree that is in accordance with an operation of a driver. For example, when the driver performs an operation to depress the accelerator, the required output that is needed for vehicle travel is set to the increase side, and if it is not possible for the motor to achieve the required output using only power that is supplied from a secondary battery, the output power of the fuel cell is controlled to the increase side to compensate for the shortfall in power.

In this connection, because a power generation reaction in a fuel cell proceeds in catalyst layers of a fuel electrode and an air electrode as described above, suppressing deterioration in the catalyst layers is an important task in terms of improving the durability of a fuel cell.

The repetition of oxidation-reduction reactions that occur on a catalyst layer may be mentioned as a factor that accelerates deterioration of a catalyst layer. For example, when the output power that is required from a fuel cell fluctuates accompanying acceleration and deceleration of a vehicle, the operating state of the fuel cell changes between idle operation and power generation operation, and in accompaniment therewith the voltages of single cells (hereunder, referred to as "cell voltage") fluctuate between a high voltage region during idle operation and a low voltage region during power generation operation. Oxidation-reduction reactions are repeated on the catalyst layers accompanying such increases and decreases in the cell voltage, and consequently the power generation reaction specific area decreases due to platinum particles of the catalyst layer on the air electrode side, in particular, agglomerating due to Ostwald ripening or being eluted, which in turn causes deterioration of the catalyst layers to proceed.

The deterioration phenomenon in the catalyst layers noticeably occurs, in particular, when transitioning to power generation operation from idle operation accompanying a decrease in the cell voltage, and this situation corresponds to a time of an accelerator depression operation which is assumed in the technology described in the aforementioned Patent Literature. However, according to the technology described in the aforementioned Patent Literature, because the output power of the fuel cell is increased unconditionally to compensate for a shortfall in the power of the secondary battery relative to the required output, it means that an operating state in which a noticeable deterioration phenomenon arises in the fuel cell is repeated each time an accelerator depression operation is performed. Hence, the technology described in the aforementioned Patent Literature has failed to serve as a measure that suppresses the occurrence of oxidation-reduction reactions on a catalyst layer at such time.

SUMMARY OF THE INVENTION

An object of the present invention is to provide a power control apparatus for a fuel cell for a vehicle which, when increasing the output power of a fuel cell in response to an increase in a required output at the time of an accelerator depression operation, can suppress oxidation-reduction reactions on a catalyst layer of a fuel electrode and an air electrode, and can thereby reliably prevent deterioration that is caused by agglomeration or elution of platinum of a catalyst layer.

To achieve the aforementioned object, the present invention is a power control apparatus for a fuel cell for a vehicle which includes a fuel cell and which is driven by an electric motor that is supplied with electric power from the fuel cell, the power control apparatus including: an accelerator sensor that detects an operation of an accelerator; and a control unit that controls the fuel cell to increase an output power of the fuel cell so as to correspond to an increase in a requested acceleration output based on an accelerator opening degree that is detected; wherein, when the accelerator opening degree is less than a first accelerator determination value that is set in advance, the control unit controls the fuel cell to suppress an increase in the output power of the fuel cell.

According to the power control apparatus for a fuel cell for a vehicle configured as described above, in a case where an accelerator opening degree is less than a first accelerator determination value, because the necessity to respond to an acceleration request of a driver is low, the drivability does not deteriorate even if an increase in the output power of the fuel cell is suppressed. Further, since a decrease in the cell voltage is slow (the rate of decrease in the cell voltage becomes smaller) as a result of an increase in the output power being suppressed, the occurrence of oxidation-reduction reactions on catalyst layers that are caused by a decrease in the cell voltage is suppressed.

Therefore, according to the power control apparatus for a fuel cell for a vehicle of the present invention, when increasing the output power of a fuel cell in response to an increase in a required output at the time of an accelerator depression operation, the occurrence of oxidation-reduction reactions on catalyst layers of a fuel electrode and an air electrode can be suppressed, and by this means a deterioration caused by agglomeration or elution of platinum of a catalyst layer can be reliably prevented.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereunder, one embodiment of a power control apparatus for a fuel cell for a vehicle that embodies the present invention is described.

Figure 1:
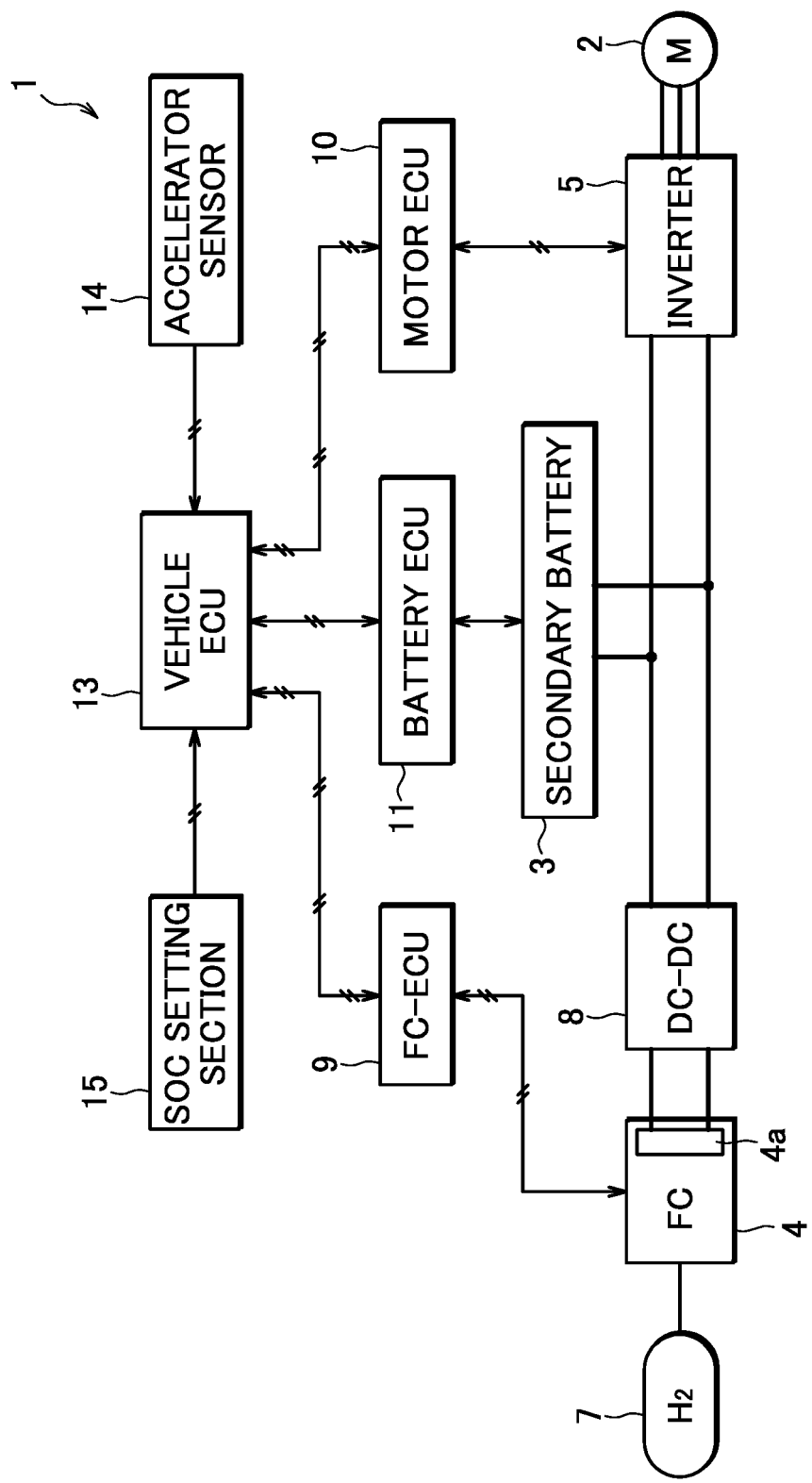
FIG. 1 is an overall configuration diagram illustrating an electrically driven vehicle in which a power control apparatus for a fuel cell according to an embodiment of the present invention is mounted.

FIG. 1 is an overall configuration diagram illustrating an electrically driven vehicle in which a power control apparatus for a fuel cell according to the present embodiment is mounted.

An electrically driven vehicle 1 of the present embodiment is a hybrid fuel cell vehicle that includes a motor 2 as a power source for travelling and also includes a secondary battery 3 (charging/discharging unit) and a fuel cell system 4 as power sources of the motor 2. As is widely known, the secondary battery 3 is an electric battery that is capable of charging and discharging direct current electric power by means of a chemical reaction, and the fuel cell system 4 is a system that generates electric power by an electrochemical reaction using hydrogen gas in a fuel cell 4a. Basically, the motor 2 is driven by electric power from the secondary battery 3, and the fuel cell system 4 mainly fulfills a function as a range extender that charges the secondary battery 3, and the output power of the fuel cell system 4 is also utilized in an auxiliary manner to drive the motor 2.

The secondary battery 3 is connected through an inverter 5 to the motor 2, and the inverter 5 performs a function of converting between direct current and alternating current. That is, during power running control of the motor 2, direct current electric power from the secondary battery 3 or the fuel cell system 4 is converted to three-phase AC electric power by the inverter 5 to drive the motor 2, and during regenerative control of the motor 2, three-phase AC electric power from the motor 2 is converted to direct current electric power by the inverter 5 to charge the secondary battery 3.

Note that, although not illustrated in the drawing, an AC-DC converter for charging is connected to the secondary battery 3, and alternating current electric power of an external power source is converted to direct current electric power by the AC-DC converter to thereby charge the secondary battery 3.

The fuel cell system 4 is connected to the secondary battery 3 and the inverter 5. The polymer electrolyte fuel cell 4a provided in the fuel cell system 4 is built by forming an MEA (Membrane Electrode Assembly) by bonding a fuel electrode (anode) and an air electrode (cathode) that carry platinum (Pt) as a catalyst on either side of a polymer electrolyte membrane, and stacking a large number of single cells in each of which the MEA is sandwiched by gas diffusion layers and separators.

The operating principles of the fuel cell 4a are widely known and therefore will not be described in detail here. In general, however, the fuel cell 4a operates as a result of hydrogen gas from a hydrogen tank 7 that is subjected to humidity regulation being supplied to the fuel electrode, and humidity-regulated air being supplied to the air electrode. The hydrogen gas supplied to the fuel electrode is split into hydrogen ions and electrons by catalytic action, and the hydrogen ions then pass through the polymer electrolyte membrane to reach the air electrode, while the electrons reach the air electrode via an unshown external circuit, and by this means a direct-current voltage is generated with the fuel electrode as negative and the air electrode as positive. Further, at the air electrode, air supplied through an air supply line, hydrogen ions that passed through the polymer electrolyte membrane and electrons that arrived via the external circuit react to generate water.

A DC-DC converter 8 is connected to an output terminal of the fuel cell 4a, and the DC-DC converter 8 is connected to the secondary battery 3 and the inverter 5. By this means, it is possible to utilize the output power of the fuel cell 4a to charge the secondary battery 3 or to drive the motor 2.

Each device (for example, a control valve that controls switching between hydrogen gas and air, and a humidifying apparatus for gas humidification) constituting the fuel cell system 4 for operating the fuel cell 4a as described above is connected to an FC-ECU (fuel cell-electronic control unit) 9, and the operating state of the fuel cell 4a is controlled by the FC-ECU 9.

On the other hand, a motor ECU (motor electronic control unit) 10 is connected to the inverter 5, and driving control of the motor 2 is executed by the motor ECU 10. For example, on one hand the motor ECU 10 drivingly controls the inverter 5 to drive the motor 2 by means of output power supplied from the secondary battery 3 or the fuel cell 4a, and on the other hand the motor ECU 10 supplies regenerated electric power to the secondary battery 3 during regenerative control of the motor 2.

Further, a battery ECU (battery electronic control unit) 11 is connected to the secondary battery 3. Charge/discharge control of the secondary battery 3 is executed by the battery ECU 11, and the battery ECU 11 also executes operations to calculate the SOC (state of charge) and to detect a temperature TEAT of the secondary battery 3 and the like.

The aforementioned FC-ECU 9, motor ECU 10 and battery ECU 11 are connected to a vehicle ECU 13 (vehicle electronic control unit) that corresponds to a superordinate unit, and the respective ECUs 9 to 11 and 13 each include an input/output device, storage devices (ROM, RAM, nonvolatile RAM or the like) and a central processing unit (CPU). The nonvolatile RAM of each storage device stores commands for various kinds of control, described later, that the respective CPUs perform.

The vehicle ECU 13 is a control unit for performing overall control of the electrically driven vehicle 1. Operational control of the fuel cell 4a, driving control of the motor 2 and charging control of the secondary battery 3 and the like that are described above are executed by the respective subordinate ECUs 9 to 11 which receive commands from the vehicle ECU 13.

Therefore, switches and sensors such as an accelerator sensor 14 that detects the accelerator opening degree APS and an SOC setting section 15 (charging rate setting section) as well as the FC-ECU 9, the motor ECU 10 and the battery ECU 11 are connected to an input side of the vehicle ECU 13, and detected information such as the accelerator opening degree APS as well as operating information of each of the fuel cell system 4, the motor 2 and the secondary battery 3 are input to the input side of the vehicle ECU 13.

The SOC setting section 15 is an input device for allowing a user of the electrically driven vehicle 1 to arbitrarily set a target SOC of the secondary battery 3. In a case where a value is not input from the SOC setting section 15, an initial value (for example, 35%) is set as the target SOC of the secondary battery 3. For example, in a case where the user plans to use the secondary battery 3 as a power source at a campsite at a destination, the user operates the SOC setting section 15 to input a higher target SOC (for example, 60%). The vehicle ECU 13 then executes charge/discharge control based on the aforementioned target SOC so that the SOC of the secondary battery 3 is increased while travelling to the destination to thereby enable use of the secondary battery 3 as a power source.

The vehicle ECU 13 calculates a required output that is necessary for travel of the electrically driven vehicle 1 based on the accelerator opening degree APS detected by the accelerator sensor 14 and the like, and outputs a command signal to the motor ECU 10 so as to achieve the required output. Based on the command signal, the motor 2 is driven by the motor ECU 10 and the required torque is achieved.

Further, the vehicle ECU 13 calculates the output power of the fuel cell system 4 based on the SOC of the secondary battery 3 and the required output for vehicle travel, and outputs a command signal to the FC-ECU 9 so as to achieve the output power. For example, in a case where the SOC of the secondary battery 3 has decreased and charging is required, or in a case where it is determined that it is not possible for the motor 2 to achieve the required output using only the electric power supply from the secondary battery 3, the vehicle ECU 13 sets the output power of the fuel cell 4a to an increase side.

The FC-ECU 9 calculates the hydrogen gas amount to be supplied to the fuel electrode and the air amount to be supplied to the air electrode in order to achieve the output power, and achieves the required output power by adjusting the calculated gas supply amounts. Naturally, in parallel with such control of the supply of hydrogen gas and air, optimum control is also performed in relation to the humidity of the hydrogen gas and air, the cell pressure and the cell temperature and the like. For example, in a case where the output power is controlled to the increase side as described above, the hydrogen gas amount and air amount are adjusted to the increase side and the output power is increased, and the increased amount of electric power is utilized to charge the secondary battery 3 by charge/discharge control of the battery ECU 11, and the increased amount of the electric power is similarly utilized to drive the motor 2 by power running control of the motor ECU 10.

Figure 2:
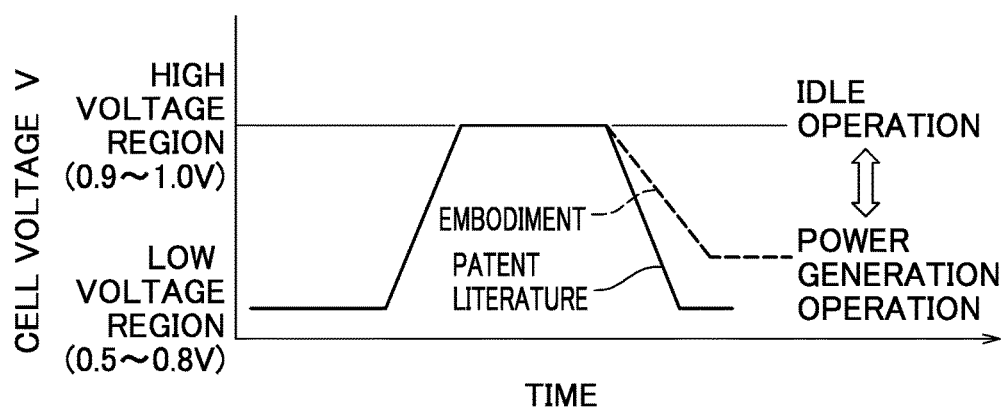
FIG. 2 is a time chart illustrating a situation in which the operating state of a fuel cell changes between idle operation and power generation operation.

As illustrated, for example, in the time chart in FIG. 2, the operating state of the fuel cell 4a changes between idle operation and power generation operation as a result of the control of the output power that is executed by the FC-ECU 9 as described above. During idle operation the fuel cell 4a generates power of only an amount that corresponds to the power required for its own operation, and a cell voltage V (voltage of the aforementioned single cell) at such time is kept in a relatively high voltage region (0.9 to 1.0 V). Subsequently, when the output power increases from the state during idle operation and operation of the fuel cell 4a transitions to power generation operation, the cell voltage V decreases due to internal resistance of the fuel cell 4a and is switched to a low voltage region (0.5 to 0.8 V).

In this connection, as described above in the "Description of the Related Art" section, according to the technology disclosed in the aforementioned Patent Literature, because the output power of the fuel cell 4a is increased unconditionally when it is not possible for the motor 2 to achieve the required output by means of only the power supply from the secondary battery 3 at the time of an accelerator depression operation (that is, an acceleration operation), there is the problem that an operating state in which a noticeable deterioration phenomenon occurs at the fuel cell 4a is repeated each time an accelerator depression operation is performed, that is, when the fuel cell 4a transitions from idle operation to power generation operation, which causes deterioration of the catalyst layers to proceed.

In consideration of this point, the present inventors focused their attention on the fact that the necessity to increase the output power of the fuel cell 4a varies depending on various conditions such as the state of accelerator depression and the SOC of the secondary battery 3. That is, the present inventors found that although in a case where there is a high necessity to respond to an acceleration request in accordance with an accelerator depression operation, the output power should be increased even if doing so is the cause of a deterioration in the catalyst layers, in a case where the necessity to respond to an acceleration request is low, some margin exists to suppress an output increase to a certain extent to prevent deterioration of the catalyst layers. Hereunder, output increase suppression processing with respect to the fuel cell 4a that is executed at the time of an accelerator depression operation based on the above findings will be described.

Figure 3:
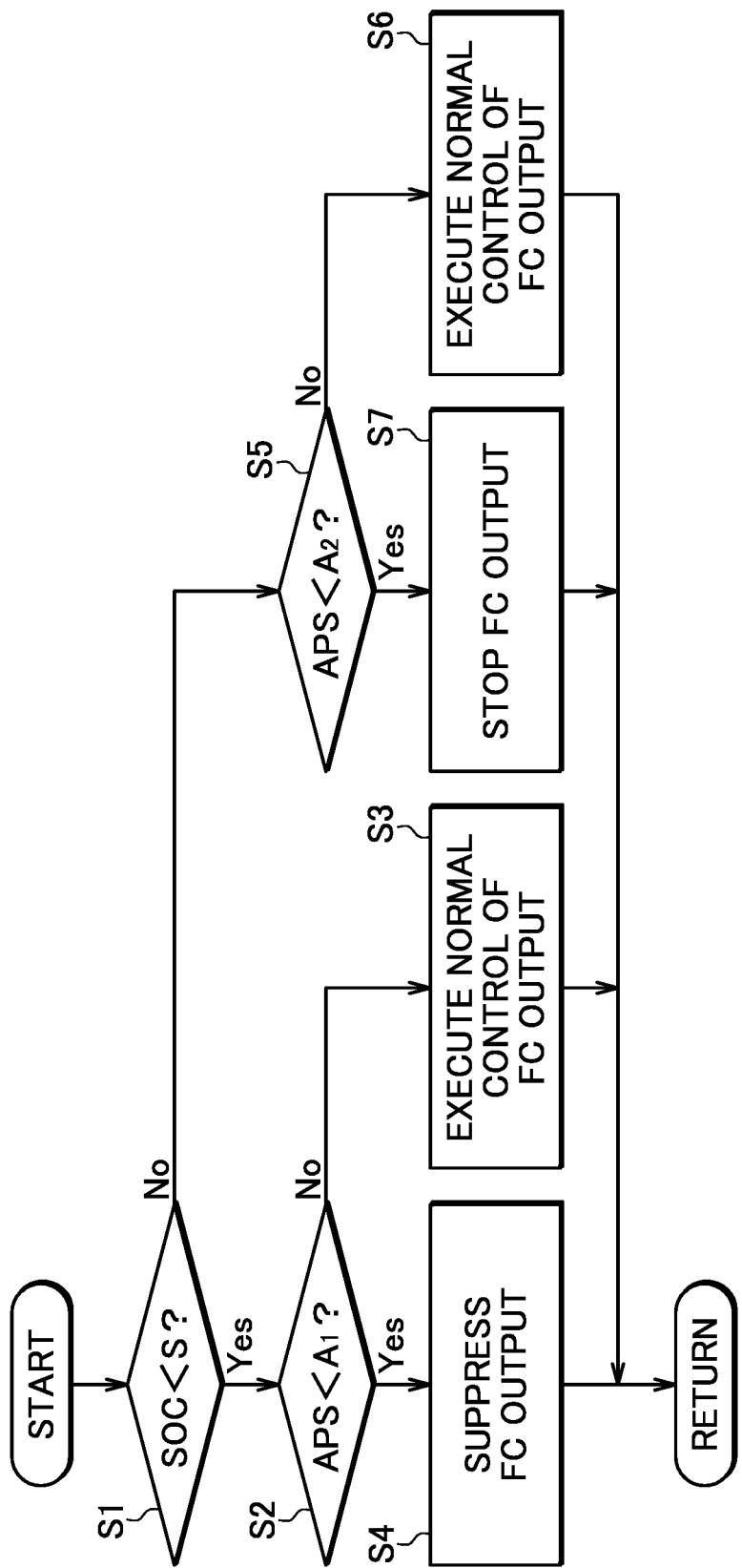
FIG. 3 is a flowchart illustrating an output increase suppression routine which a vehicle ECU executes.

FIG. 3 illustrates an output increase suppression routine that the vehicle ECU 13 executes. The vehicle ECU 13 executes this routine at predetermined control intervals during an accelerator depression operation.

In this case, to facilitate the description it is assumed that an accelerator depression operation was performed by a driver while the electrically driven vehicle 1 is travelling.

First, in step S1, the vehicle ECU 13 determines whether or not the SOC of the secondary battery 3 is less than an SOC determination value S that is set in advance. In the present embodiment, the SOC determination value S is set in conjunction with the target SOC of the secondary battery 3, and when the user inputs the target SOC by means of the SOC setting section 15, the target SOC is set as the SOC determination value S. In the following description, it is assumed that no value is input for the target SOC from the SOC setting section 15 and the initial value (35%) is set as the SOC determination value S. However, the SOC determination value S is not limited to the above value, and for example, may be set to an arbitrary fixed value.

If the result of the determination in step S1 is "Yes" (affirmative), the processing transitions to step S2 in which the vehicle ECU 13 determines whether or not the accelerator opening degree APS that is detected by the accelerator sensor 14 is less than a first accelerator determination value A1 that is set in advance. If the result of the determination in step S2 is "No" (negative), the processing transitions to step S3, in which the vehicle ECU 13 increases the output power of the fuel cell 4a as normal without suppressing the increase in the output power and thereafter ends the routine for the time being.

In this situation, because the SOC is less than the SOC determination value S, it is desirable to charge the secondary battery 3 at an early stage, and because the accelerator opening degree APS is equal to or greater than the first accelerator determination value A1 it is also necessary to respond to the acceleration request of the driver. Hence, responding to the acceleration request is given priority over preventing deterioration of the catalyst layers of the fuel cell 4a.

If the result of the determination in step S2 is "Yes", the processing transitions to step S4, in which the vehicle ECU 13 suppresses an increase in the output power of the fuel cell 4a more than during normal operation. Specifically, the vehicle ECU 13 calculates the output power of the fuel cell 4a in accordance with the SOC of the secondary battery 3 and an elapsed time t from the time of accelerator depression according to a map illustrated in FIG. 4. Note that, the output power at this time is a target value for instructing the FC-ECU 9, and the actual output power follows the target value with a delay that is in accordance with the response characteristics of the fuel cell 4a.

The values of 2 sec, 10 sec, 20 sec, 30 sec, 40 sec, 50 sec and 60 sec are set as respective values for the elapsed time t from the time of accelerator depression. For example, if 2 seconds elapses from the time of accelerator depression, an output power that corresponds to the actual SOC of the secondary battery 3 is calculated in accordance with a characteristic line for 2 sec (hereunder, referred to as "characteristic line 2"; the other characteristic lines are similarly referred to according to the respective values for the elapsed time t), if 10 seconds elapses, the output power is calculated in accordance with a characteristic line 10, and if 20 seconds elapses, the output power is calculated in accordance with a characteristic line 20 in that order. Basically, the respective characteristic lines 2 to 60 are set so that output powers are determined that are located progressively further on the increase side as the actual SOC decreases from the target SOC (35%) as the starting point, and a progressively larger output power is determined as the size of the characteristic line with respect to the elapsed time t increases (in other words, as the greater amount of time elapses from the time of accelerator depression).

Figure 4:
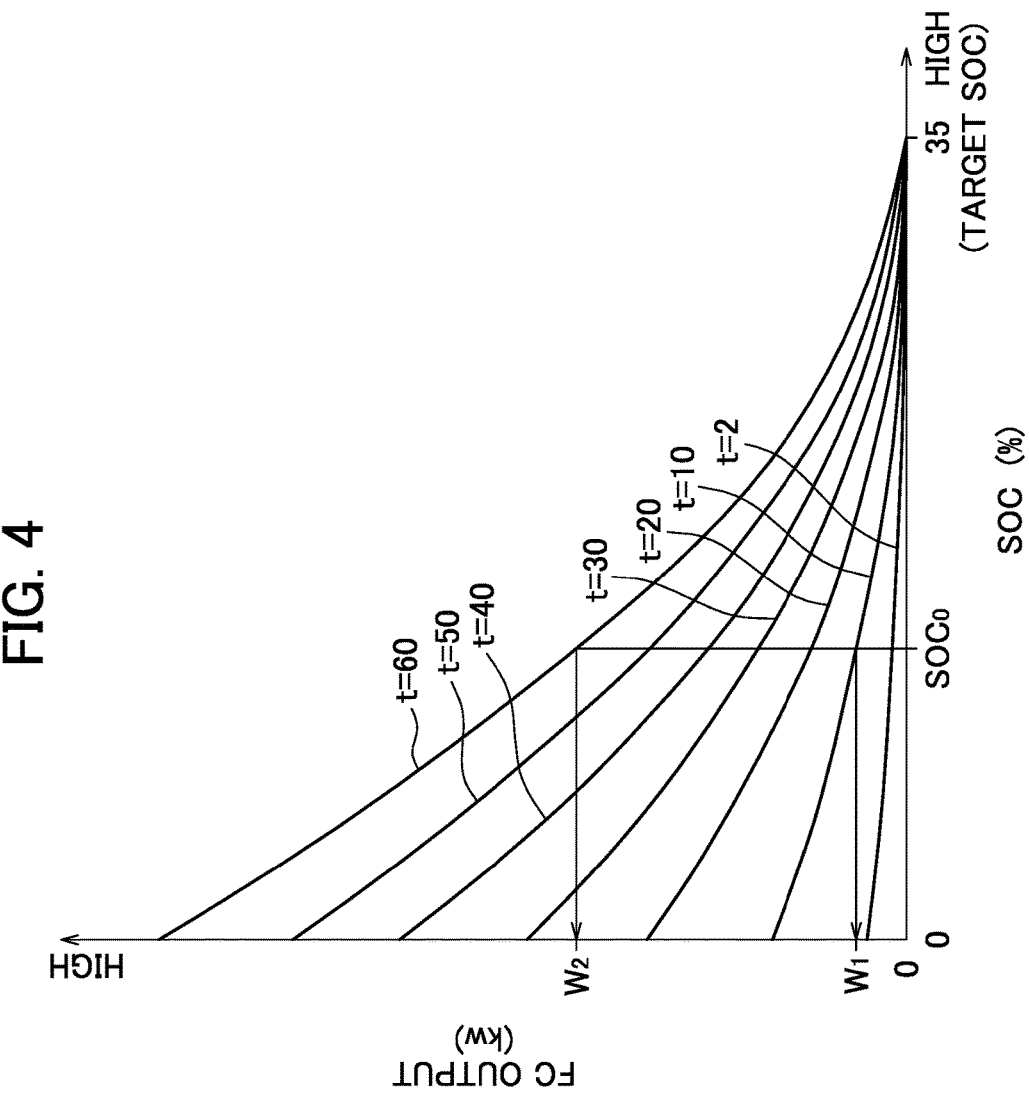
FIG. 4 is an explanatory drawing illustrating a map for calculating an output power of a fuel cell according to an SOC of a secondary battery and an elapsed time t from a time of accelerator depression.

The characteristics of the map in FIG. 4 can be expressed by the following equations (1) and (2).

$$y=a(x-b)^2 \quad (1)$$

$$a=ct \quad (2)$$

In the above equations (1) and (2), y represents the output power of the fuel cell 4a, x represents the actual SOC of the secondary battery 3, b represents the target SOC (35%), t represents the elapsed time from the time of accelerator depression, and c represents a coefficient.

Therefore, as illustrated in the drawing as one example, when an accelerator depression operation is performed in a state in which the SOC of the secondary battery 3 is a predetermined SOC0, output powers corresponding to SOC0 in accordance with the respective characteristic lines are sequentially calculated in the order of the characteristic lines 2 to 60, and in accompaniment therewith the output power of the fuel cell 4a gradually increases. Note that, because the secondary battery 3 is gradually charged by the output power of the fuel cell 4a, although the actual SOC increases somewhat with the passage of time from the time of accelerator depression, this increase in the actual SOC is omitted from the drawing for convenience of description.

As a result of calculating the output power in this way, for example, in a case where an accelerator depression operation is stopped 10 seconds after starting, the output power will gradually increase from 0 and reach W1 that corresponds to SOC0 on the characteristic line 10 after 10 seconds, and at that time point will revert to 0 together with stopping of the accelerator depression operation. Further, in a case where an accelerator depression operation continues for 60 seconds, after 60 seconds the output power will reach W2 that corresponds to SOC0 on the characteristic line 60.

Since the characteristic line 60 is also a characteristic line in a case where an increase in the output power is not suppressed, in the processing in step S3 that is described above, simultaneously with depression of the accelerator, the output power increases directly to W2 that corresponds to SOC0. In contrast, according to the processing in step S4, the output power is strongly suppressed at the start of the accelerator depression operation, and the suppression of the output power is gradually relaxed in accordance with the elapsed time t. Therefore, because an increase in the output power is delayed, the output power at the same timing (same elapsed time t) is suppressed in comparison to the case of the processing in step S3 in which the output power is not suppressed, and consequently an increase in the output power is suppressed.

In most cases an accelerator depression operation is stopped without continuing for 60 seconds, and therefore in such cases the final output power after an increase is lowered compared to the case of the processing in step S3 in which the output power is not suppressed.

The fuel cell 4a at this time transitions from idle operation to power generation operation accompanying a decrease in the cell voltage, and as shown by a dashed line in FIG. 2, the decrease in the cell voltage is a slower decrease (in other words, the rate of decrease is smaller) compared to a case in which the output power is not suppressed that is illustrated by a solid line (which also represents the situation under the control according to the above described Patent Literature), and in some cases the amount of the decrease in the cell voltage is also reduced.

Under these circumstances, although it is desirable that the secondary battery 3 is charged at an early stage since the SOC is less than the SOC determination value S, because the accelerator opening degree APS is less than the first accelerator determination value A1, the necessity to respond to the acceleration request of the driver is low. Hence, preventing deterioration of the catalyst layers of the fuel cell 4a is given priority over responding to the acceleration request, and an increase in the output power is therefore suppressed.

On the other hand, if the result of the determination in the aforementioned step S1 is "No", the processing transitions to step S5 in which it is determined whether or not the accelerator opening degree APS is less than a second accelerator determination value A2 that is set in advance. The second accelerator determination value A2 is set to a larger value than the first accelerator determination value A1. If the result of the determination in step S5 is "No", the processing transitions to step S6, in which the output power of the fuel cell 4a is increased as normal without being suppressed, similarly to the above described step S3.

In comparison to the case in step S3, in this situation, although there is no great necessity to quickly charge the secondary battery 3 since the SOC is equal to or greater than the SOC determination value S, because the accelerator opening degree APS is larger there is a greater necessity to respond to the acceleration request of the driver. Hence, similarly to the case in step S3, responding to the acceleration request is prioritized over preventing deterioration of the catalyst layer of the fuel cell 4a.

Further, if the result of the determination in step S5 is "Yes", the processing transitions to step S7 in which the vehicle ECU 13 stops increasing the output power of the fuel cell 4a. That is, if the fuel cell 4a is in the state of idle operation at this time point, the vehicle ECU 13 continues the idle operation, while if the fuel cell 4a is performing a power generation operation which decreases the cell voltage by even a small amount, the vehicle ECU 13 continues the operating state of the fuel cell 4a at that time point. The processing at this time is based on the viewpoint that, since an SOC of a certain amount is secured in the secondary battery 3 and thus electric power of an amount which makes it possible to achieve the required output can be supplied to the motor 2, the output power of the fuel cell 4a is not necessary.

Note that, if the SOC falls to less than the SOC determination value S due to discharge of the secondary battery 3 during an accelerator depression operation, the processing transitions from step S1 to step S2, and the output power control of step S3 or S4 is then executed in accordance with the accelerator opening degree APS as described above.

As described in detail above, according to the power control apparatus for the fuel cell 4a for a vehicle of the present embodiment, in a case where an accelerator depression operation is performed in a state in which the SOC of the secondary battery 3 is less than the SOC determination value S, on one hand the output power of the fuel cell 4a is increased as normal if the accelerator opening degree APS is equal to or greater than the first accelerator determination value A1, while on the other hand an increase in the output power of the fuel cell 4a is suppressed in comparison to the time of normal operation if the accelerator opening degree APS is less than the first accelerator determination value A1.

In the latter situation (APS<A1), because the necessity to respond to an acceleration request of the driver is low, the drivability does not deteriorate even if an increase in the output power of the fuel cell 4a is suppressed to a certain extent, and a decrease in the cell voltage also becomes slow as a result of the increase in the output power being suppressed, and in some cases the amount of decrease in the cell voltage is also reduced. Hence, the occurrence of oxidation-reduction reactions on catalyst layers due to a decrease in the cell voltage is suppressed, and deterioration of the catalyst layers that is ascribable to agglomeration and elution of platinum that accompanies oxidation-reduction reactions can be reliably prevented.

In addition, even in a case where it is desirable to charge the secondary battery 3 at an early stage because the SOC is less than the SOC determination value S, an increase in the output power is suppressed if the accelerator opening degree is less than the first accelerator determination value A1 and the necessity to respond to an acceleration request is therefore low. Consequently, the occurrence of oxidation-reduction reactions on the catalyst layers can be suppressed in a greater number of cases, and as a result the opportunities for transitioning to an operating state that deteriorates the catalyst layers decreases, and in this respect also the present invention contributes to preventing deterioration of catalyst layers.

Further, in a case where the SOC of the secondary battery 3 is equal to or greater than the SOC determination value S, on the condition that the accelerator opening degree APS is less than the second accelerator determination value A2 that is larger than the first accelerator determination value A1, increasing of the output power of the fuel cell 4a is stopped.

By this means, because it is possible to stop the fuel cell 4a and the cell voltage is maintained in a low voltage region, the occurrence of oxidation-reduction reactions on the catalyst layers can be suppressed more reliably, and thus deterioration of the catalyst layers can be reliably prevented.

Further, during an accelerator depression operation, output powers that correspond to the actual SOC of the secondary battery 3 are calculated sequentially based on characteristic lines in accordance with the elapsed time t from the time of accelerator depression based on the map in FIG. 4. Therefore, because suppression of the output power of the fuel cell 4a is gradually relaxed in accordance with the elapsed time t, an increase in the output power can be suppressed, and furthermore, in a case where an accelerator depression operation is stopped after a short time, the final output power after the increase is also lowered. Consequently, the occurrence of oxidation-reduction reactions on the catalyst layers can be suppressed more reliably.

Furthermore, the SOC determination value S is set in conjunction with input of a target SOC by means of the SOC setting section 15, and the determination property with respect to the SOC in step S1 in FIG. 3 is updated in accordance therewith. For example, if the user inputs a target SOC that is on the increase side in order to preserve the SOC of the secondary battery 3, the possibility of the processing in step S4 being executed rather than the processing in step S7 as the result of the determination with respect to the SOC that is based on the high SOC determination value S will increase. Although according to the processing in step S7 the electric power consumption for driving the motor 2 using only the secondary battery 3 is very large and is the cause of a decrease in the SOC, according to the processing in step S4, although an increase in the output power of the fuel cell 4a is suppressed, the electric power of the secondary battery 3 is saved by an amount that corresponds to the output power of the fuel cell 4a. That is, with regard to the processing to suppress an increase in the output of the fuel cell 4a also, because the processing switches to optimal control contents for preserving the SOC, the SOC of the secondary battery 3 can be more reliably maintained in a manner that satisfies a request of the user.

While the present embodiment has been described above, it is to be noted that various changes can be made to the present embodiment. Hereunder, a first and second modification will be described.

A feature of the first modification is that the first accelerator determination value A1 is variably set according to the SOC of the secondary cell 3.

Figure 5:
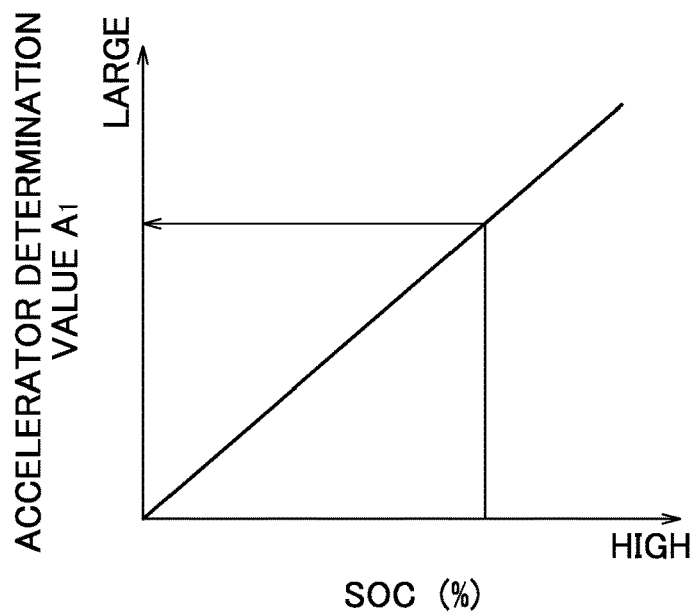
FIG. 5 is an explanatory drawing illustrating a map for calculating a first accelerator determination value A1 based on the SOC of the secondary battery.

FIG. 5 illustrates a map for calculating the first accelerator determination value A1 based on the SOC. In the map illustrated in FIG. 5, the higher the SOC is, the further on the increase side the value of the first accelerator determination value A1 is calculated as being. Hence, the higher that the SOC of the secondary battery 3 is, in other words, the lower that the necessity of charging the secondary battery 3 is, the higher the possibility is that the processing in step S4 in FIG. 3 will be executed rather than the processing in step S3 in FIG. 3, and thus the more likely it is that an increase in the output power of the fuel cell 4a will be suppressed. Consequently, according to Modification 1, suppression of an increase in the output power in accordance with the SOC of the secondary battery 3 can be executed in a more detailed manner and the occurrence of oxidation-reduction reactions on the catalyst layers can be suppressed in a greater number of cases, and thus prevention of deterioration of the catalyst layer can be made even more reliable.

Note that, based on a similar idea, the higher that the SOC of the secondary battery 3 is, the further on the increase side the value of the second accelerator determination value A2 may be calculated as being. In this case, since an increase in the output power is liable to be stopped in step S7, while a duplicate description is omitted here, prevention of deterioration of the catalyst layers can be achieved more reliably.

A feature of the second modification is that the coefficient c that is one of the requirements that determine the characteristics of the map in FIG. 4 is variably set in accordance with the accelerator opening degree APS.

As described above, suppression of an increase in the output power of the fuel cell 4a is gradually relaxed in accordance with the elapsed time t, and the rate of relaxation is determined by the coefficient c in a manner such that, the larger that the coefficient c is, the earlier the suppression is relaxed and the more rapidly the output power increases. In this sense, in the following description the coefficient c is referred to as "suppression relaxation coefficient c".

Figure 6:
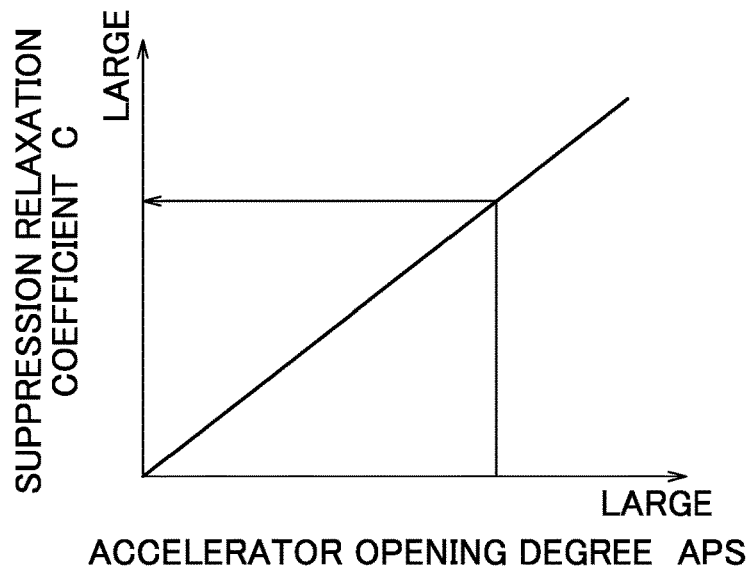
FIG. 6 is an explanatory drawing illustrating a map for calculating a suppression relaxation coefficient c based on an accelerator opening degree APS.

FIG. 6 illustrates a map for calculating the suppression relaxation coefficient c based on the accelerator opening degree APS. In the map, the larger that the accelerator opening degree APS is, the further on the increase side that the value of the suppression relaxation coefficient c is calculated as being. Hence, the larger that the accelerator opening degree APS is, in other words, the greater that the acceleration requested by the driver is, the earlier that suppression of an increase in the output power that is based on the map in FIG. 4 is relaxed and, as a result, the more rapidly the output power is increased. Therefore, in a case where a request for high acceleration is made by the driver, the output power can be rapidly increased to respond to the acceleration request even though the rate of increase is suppressed in comparison to a time of normal operation, and on the other hand when the acceleration request by the driver is for low acceleration, the rate of increase in the output power is slowed down to thereby contribute to preventing deterioration of the catalyst layers. Hence, according to the present Modification 2, it is possible to achieve compatibility at a high level between responding to an acceleration request of the driver and preventing deterioration of the catalyst layers.

While an embodiment of the present invention has been described above, it is to be noted that aspects of the present invention are not limited to the foregoing embodiment. For example, although in the flowchart in FIG. 3 of the above described embodiment a case in which the SOC of the secondary battery 3 is less than the SOC determination value S is taken as a premise when determining whether or not to suppress an increase in the output power of the fuel cell 4a in accordance with the accelerator opening degree APS in step S2, the processing in step S2 may be executed without taking the SOC into consideration.

Further, in the above embodiment, although suppression of an increase in the output power is gradually relaxed based on the map in FIG. 4, a technique for suppressing an increase in the output power is not limited thereto and can be arbitrarily changed. For example, a configuration may be adopted so as to limit an increase in the output power of the fuel cell 4a to a previously set upper limit value in a case where the accelerator opening degree APS is less than the first accelerator determination value A1.

What is claimed is:

1. A power control apparatus for a fuel cell vehicle which includes a fuel cell and which is driven by an electric motor that is supplied with electric power from the fuel cell, the power control apparatus comprising:

an accelerator sensor that detects an operation of an accelerator; and a control unit that controls the fuel cell to increase an output power of the fuel cell so as to correspond to an increase in a requested acceleration output based on an accelerator opening degree that is detected;

wherein, when the accelerator opening degree is less than a first accelerator determination value that is set in advance, the control unit controls the fuel cell to suppress an increase in the output power of the fuel cell.

2. The power control apparatus for a fuel cell for a vehicle according to claim 1, further comprising a charging/discharging unit that supplies electric power to the electric motor, wherein the control unit:

controls the fuel cell to increase the output power of the fuel cell to charge the charging/discharging unit when it is determined that a charging rate of the charging/discharging unit decreases to less than a predetermined charging rate that is set in advance; and when the accelerator opening degree is less than the first accelerator determination value, even in a case where the charging rate of the charging/discharging unit is less than the predetermined charging rate, controls the charging/discharging unit to suppress an increase in the output power of the charging/discharging unit.

3. The power control apparatus for a fuel cell vehicle according to claim 2, wherein the control unit sets the first accelerator determination value to an increase side in accordance with an increase in the charging rate of the charging/discharging unit.

4. The power control apparatus for a fuel cell vehicle according to claim 3, wherein the control unit controls the fuel cell to stop increasing the output power of the fuel cell at a time that the charging rate of the charging/discharging unit is equal to or greater than the predetermined charging rate and the accelerator opening degree is less than a second accelerator determination value that is set, in advance, greater than the first accelerator determination value.

5. The power control apparatus for a fuel cell vehicle according to claim 4, wherein the control unit controls the fuel cell to gradually relax suppression of an increase in the output power of the fuel cell in accordance with an elapsed time from a start of the accelerator acceleration operation.

6. The power control apparatus for a fuel cell vehicle according to claim 5, wherein the control unit controls the fuel cell so that, the larger that the accelerator opening degree is in a region in which the accelerator opening degree is less than the first accelerator determination value, the earlier that suppression of an increase in the output power of the fuel cell is relaxed.

7. The power control apparatus for a fuel cell vehicle according to claim 6, further comprising a predetermined charging rate setting unit into which an arbitrary predetermined charging rate can be input.

8. The power control apparatus for a fuel cell vehicle according to claim 3, wherein the control unit controls the fuel cell to gradually relax suppression of an increase in the output power of the fuel cell in accordance with an elapsed time from a start of the accelerator acceleration operation.

9. The power control apparatus for a fuel cell vehicle according to claim 8, wherein the control unit controls the fuel cell so that, the larger that the accelerator opening degree is in a region in which the accelerator opening degree is less than the first accelerator determination value, the earlier that suppression of an increase in the output power of the fuel cell is relaxed.

10. The power control apparatus for a fuel cell vehicle according to claim 2, wherein the control unit controls the fuel cell to stop increasing the output power of the fuel cell at a time that the charging rate of the charging/discharging unit is equal to or greater than the predetermined charging rate and the accelerator opening degree is less than a second accelerator determination value that is set, in advance, greater than the first accelerator determination value.

11. The power control apparatus for a fuel cell vehicle according to claim 10, wherein the control unit controls the fuel cell to gradually relax suppression of an increase in the output power of the fuel cell in accordance with an elapsed time from a start of the accelerator acceleration operation.

12. The power control apparatus for a fuel cell vehicle according to claim 11, wherein the control unit controls the fuel cell so that, the larger that the accelerator opening degree is in a region in which the accelerator opening degree is less than the first accelerator determination value, the earlier that suppression of an increase in the output power of the fuel cell is relaxed.

13. The power control apparatus for a fuel cell vehicle according to claim 2, wherein the control unit controls the fuel cell to gradually relax suppression of an increase in the output power of the fuel cell in accordance with an elapsed time from a start of the accelerator acceleration operation.

14. The power control apparatus for a fuel cell vehicle according to claim 13, wherein the control unit controls the fuel cell so that, the larger that the accelerator opening degree is in a region in which the accelerator opening degree is less than the first accelerator determination value, the earlier that suppression of an increase in the output power of the fuel cell is relaxed.

15. The power control apparatus for a fuel cell vehicle according to claim 2, further comprising a predetermined charging rate setting unit into which an arbitrary predetermined charging rate can be input.

16. The power control apparatus for a fuel cell vehicle according to claim 1, wherein the control unit controls the fuel cell to gradually relax suppression of an increase in the output power of the fuel cell in accordance with an elapsed time from a start of the accelerator acceleration operation.

17. The power control apparatus for a fuel cell vehicle according to claim 16, wherein the control unit controls the fuel cell so that, the larger that the accelerator opening degree is in a region in which the accelerator opening degree is less than the first accelerator determination value, the earlier that suppression of an increase in the output power of the fuel cell is relaxed.

* * * * *